US007711040B2

(12) United States Patent (10) Patent No.: US 7,711,040 B2
Liang et al. (45) Date of Patent: May 4, 2010

(54) ADAPTIVE MODEM

(75) Inventors: Min Liang, Morganville, NJ (US); Jerry Zhenyu Wang, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 1127 days.

(21) Appl. No.: 10/993,378

(22) Filed: Nov. 19, 2004

(65) Prior Publication Data

US 2006/0109894 A1 May 25, 2006

(51) Int. Cl.
*H04B 1/38* (2006.01)
*H04L 5/16* (2006.01)

(52) U.S. Cl. ........................ 375/222; 375/219; 375/220; 375/221; 375/227; 375/228; 375/316; 379/93.31; 379/93.32; 379/93.35; 455/39; 455/67.11; 455/67.13; 370/241; 370/252

(58) Field of Classification Search .................. 375/222, 375/219–220, 231, 354, 359, 371, 377, 316; 379/93.31, 93.32, 93.35; 370/241, 252; 455/39, 455/67.11, 67.13
See application file for complete search history.

(56) References Cited

U.S. PATENT DOCUMENTS

| | | | | |
|---|---|---|---|---|
| 4,621,366 A * | 11/1986 | Cain et al. | .................. | 375/222 |
| 6,002,713 A | 12/1999 | Goldstein et al. | | |
| 6,185,250 B1 * | 2/2001 | Wang et al. | .................. | 375/222 |
| 6,404,809 B1 | 6/2002 | Zhang | | |
| 6,445,733 B1 * | 9/2002 | Zuranski et al. | .............. | 375/231 |
| 6,570,917 B1 | 5/2003 | Lai et al. | | |
| 6,662,322 B1 * | 12/2003 | Abdelilah et al. | ........... | 714/708 |
| 6,687,306 B1 | 2/2004 | Wang et al. | | |
| 6,693,998 B2 * | 2/2004 | Olafsson | .................. | 379/93.31 |
| 6,819,749 B1 * | 11/2004 | Olafsson et al. | .......... | 379/93.32 |
| 7,027,573 B2 * | 4/2006 | Olafsson et al. | .......... | 379/93.32 |
| 2001/0048667 A1 | 12/2001 | Hamdi | | |

OTHER PUBLICATIONS

European Patent Office Search Report for Corresponding European Patent Application No. 05254791.6-2414.

* cited by examiner

*Primary Examiner*—Mohammad H Ghayour
*Assistant Examiner*—Sophia Vlahos (57) ABSTRACT

A modem uses information from prior calls in a current call if the current communication line is similar to the communication line of a prior call. During modem training, the current communication line is compared to a communication line used during at least one prior call. If the characteristics are substantially similar, stored data mode information from the prior call(s) is used to design a signal constellation for use during the current call's data mode. If the number of prior calls exceeds a value, then the signal constellation may be designed using previously stored data mode information without using information from the current call's training mode. If the number of prior calls does not exceed the value, then the signal constellation may be designed using the previously stored data mode information and information from the current call's training mode.

56 Claims, 2 Drawing Sheets

ADAPTIVE MODEM

BACKGROUND OF THE INVENTION

The present invention relates generally to data communications, and more particularly to an adaptive modem.

The widespread use of data networks (e.g., the Internet) has increased the deployment of modems (modulator/demodulator). Modems are well known in the art, and generally function to modulate and demodulate digital signals so that they may be transmitted via analog communication channels. One of the most popular uses for a modem is to allow end users to connect to the Internet from their homes via the public switched telephone network (PSTN).

Upon startup, modems enter a training mode of operation during which a communication link is established with another modem device. In general, training is performed in order to determine the characteristics of the communication line (i.e., communication channel) and to optimize the subsequent data mode during which data is communicated between the modems. In a modem operating in accordance with the International Telecommunications Union (ITU) V.90/V.92 standard, there are 4 training phases as follows.

During phase 1 training, the client modem obtains a dial tone, calls the remote modem, and the two modems exchange basic information such as the modem standards that are supported by the modems. If both modems support V.92, then the client modem detects whether the current communication line is the same as a previously used communication line by an analysis of the ANSpcm signal (as defined in the ITU-T V.92 standard) transmitted by the remote modem. If the communication line is the same, then the client modem may utilize a fast connection feature in which certain of the phase 3 training steps are shortened or omitted in order to speed up the initialization process.

During phase 2 training the local parameters for V.90/V.92 (e.g., symbol rate, maximum transmission power, A-law or μ-law codec) are exchanged between the client and remote modems.

Phase 3 training consists of training the modem equalizer and echo canceller, timing recovery and digital impairment learning (DIL), in order to detect and compensate for network impairments and distortions.

During phase 4 training, conventional modems estimate the training mode mean square error (MSE) and then estimate the relationship between the training mode MSE and the data mode MSE. The estimation of data mode MSE based only on training data is difficult because the relationship between the training mode MSE and the data mode MSE is unknown and different for varying communication line conditions. The conversion of the training mode MSE into an estimated data mode MSE is usually performed using a multiplication factor. The estimated data mode MSE is then used as the data mode noise level for constellation design.

As is well known, a pulse code modulation (PCM) signal constellation consists of a set of real-valued signal points which lie on an 1-dimensional grid. During the data mode, user data is encoded into constellation points and one constellation point is transmitted during each symbol period. Since the V.90/V.92 symbol rate is fixed at 8K samples per second, the more levels used in the constellation, the higher the data rate. Thus, PCM signal constellation design is an important part of the training mode for a V.90/V.92 modem because the constellation design has a significant impact on the modem data rate. More particularly, a V.90/V.92 PCM modem transmits a PCM level as a symbol signal at a rate of 8000 symbols per second. This means that every $\frac{1}{8000}$ second the modem transmits one symbol signal representing a digital code. Mathematically, all of the possible symbol signals could be expressed in math space. In signal space, every signal has a unique point position, and any two signals have a distance between them. The greater the distance between signal points, the easier to distinguish between them, which allows for more reliable signal detection and a resultant lower bit error rate. However, there is a tradeoff, because the greater the distance between signal points, the less total available signals that can be used in the signaling constellation, and therefore the lower the data rate. Thus, determining the minimal signal distance is important to achieve a high data rate for a given communication line. Existing modems only make a rough estimate of the best minimal signal distance to achieve the best data rate in data mode because, as described above, the data rate is determined solely during the training mode without using any actual data mode information.

The above described modem training procedures are performed each time a modem is initialized. Such training procedures are time consuming and do not always result in optimized data rates for a particular communications channel.

What is needed is an improved modem training technique which can decrease required training time while at the same time improve training results.

BRIEF SUMMARY OF THE INVENTION

The present invention takes advantage of the recognition that information from prior modem calls can be used in a current modem call if the communication line of the prior call has the same characteristics as the communication line of the current call. By recording information during the data mode of prior calls, the modem performance for subsequence calls can be substantially improved. This improvement includes not only improvement in the speed of training, but an improvement of the constellation design during the training mode, such that the data rate during the data mode of the subsequent calls is also improved.

In accordance with one embodiment of the invention, during modem training, a determination is made as to whether the characteristics of the current communication line is substantially similar to the characteristics of a communication line used during at least one prior call. In one embodiment, this determination is made by extracting a digital impairment learning signal from a signal received from a remote modem and comparing the extracted digital impairment learning signal to a stored digital impairment learning signal extracted during at least one prior call.

If the characteristics are substantially similar, the stored data mode information from the prior call(s) is used to design a signal constellation for use during the current call's data mode. If the characteristics are not substantially similar, then full modem training is performed and data mode information is stored for use during subsequent calls. Exemplary data mode information which may be stored in accordance with the principles of the present invention includes mean squared error data, constellation minimal signal distance and constellation transmission power.

In addition to the communication line similarity test, line quality evaluation may also be performed in order to determine whether there has been a change in the quality of the communication line between the current call and prior call(s). If there has been no change in line quality, then a signal constellation is designed using stored minimal signal distance from one or more prior calls. If there has been a change for the better in line quality, then a signal constellation is designed having a smaller minimal signal distance than the one or more prior call's signal constellation. If there has been a change for the worse in line quality, then a signal constellation is designed having a larger minimal signal distance than the one or more prior call's signal constellation.

These and other advantages of the invention will be apparent to those of ordinary skill in the art by reference to the following detailed description and the accompanying drawings.

DETAILED DESCRIPTION

Figure 1:
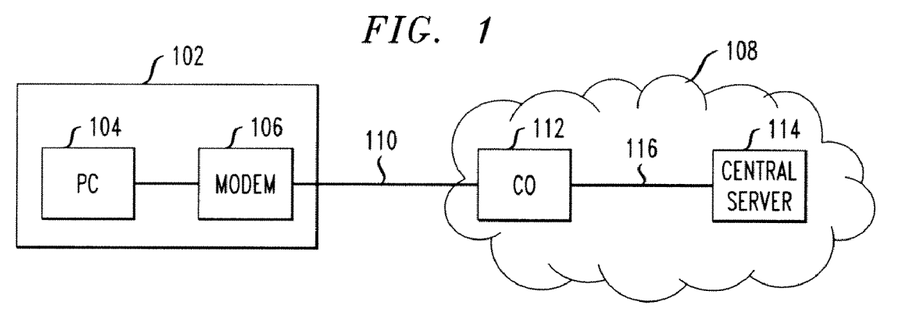
FIG. 1 shows an exemplary network in which the principles of the present invention may be advantageously implemented.

FIG. 1 shows an exemplary network in which the principles of the present invention may be advantageously implemented. A customer premises 102 includes a personal computer (PC) 104 and a modem 106. PC 104 may be any type of well known computer comprising a processor, memory, data storage, and user input/output devices. As is well known, a PC operates under control of computer software which defines the overall operation of the computer. PCs are well known in the art and will not be described in detail herein. PC 104 may include an internal or external modem, such as modem 106. In FIG. 1, modem 106 is shown as an external modem for ease of reference only. In many advantageous embodiments, modem 106 would be internal to PC 102. In an advantageous embodiment, modem 106 operates in accordance with the ITU V.90/V.92 standard. The present detailed description will describe the functions performed by a modem in accordance with the principles of the present invention. One skilled in the art will readily understand how to implement such functions using well known modem design techniques. For example, the modem functions described herein may be implemented in modem software, hardware, or a combination of software and hardware. A typical modem designed in accordance with the principles of the present invention will have one or more processors which control the overall functioning of the modem via embedded software or firmware. Such embedded software may be, for example, stored computer program instructions. In addition to the one or more processors, a typical modem designed in accordance with the principles of the present invention will also have dedicated hardware circuits to perform certain modem functions. One skilled in the art will recognize that the description herein focuses on those modem functions which are unique to the present invention, while other general modem functions, although not described in detail herein, would also be present in a typical modem User premises 102 is connected to a central office (CO) 112 in the public switched telephone network 108 via analog line 110. CO 112 is further connected to a central server 114 via digital line 116. For purposes of the present description, assume that a user of PC 104 desires to establish a connection between PC 104 and central server 114 via modem 106.

As will be described in further detail below, the present invention takes advantage of the recognition that information from prior modem calls can be used in a current modem call if the communication line (i.e., communication channel) between the modem 106 and the central server 114 from the prior call has the same characteristics as the communication line of the current call. By recording information during the data mode of prior calls, the modem performance for subsequence calls can be substantially improved. This improvement includes not only improvement in the speed of training, but an improvement of the constellation design during the training mode, such that the data rate during the data mode of the subsequent calls is also improved.

Figure 2:
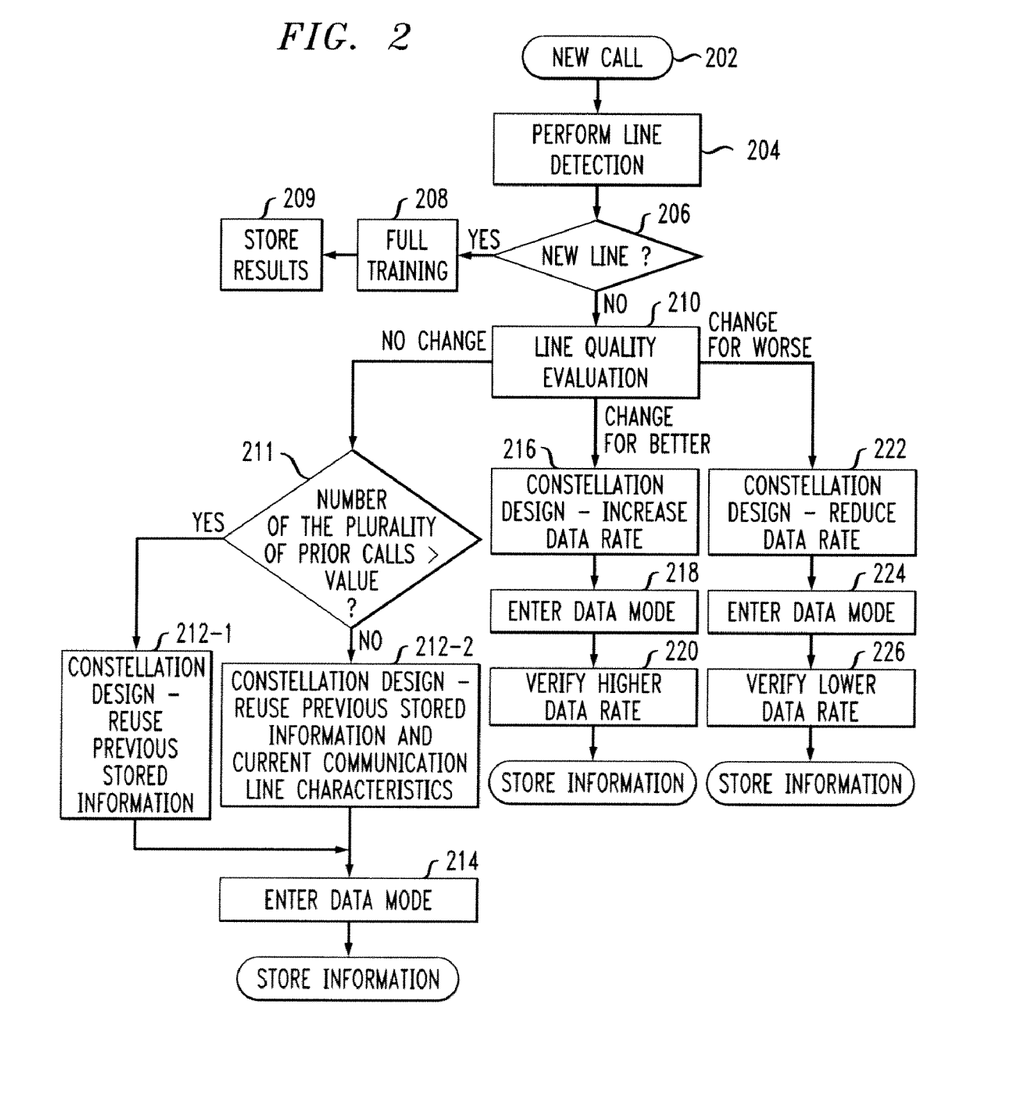
FIG. 2 shows a flowchart of the steps performed by a modem during a training mode in accordance with an embodiment of the present invention.

FIG. 2 shows a flowchart of the steps performed by modem 106 during a training mode in accordance with an embodiment of the present invention. First, in step 202 a new call is initiated by modem 106. In step 204, modem 106 performs line detection in order to determine whether modem 106 is connecting to the remote modem via the same line as used during one or more previous calls. This line detection step will be described in further detail with reference to the flowchart of FIG. 3. The first step is line feature extraction 304 of the signal 302. The signal 302 is the training signal transmitted by the central server 114 and received by modem 106. As signal 302 travels through the telephone network 108 and analog line 110 to the customer premises 102, the signal is distorted due to various characteristics of the communication channel. For example, the distortion is partially caused by the network switches utilizing robbed bit signaling (RBS). Also, network codecs cause digital loss and codec noise, and the analog telephone line 110 causes attenuation. Further, as is well known, there are various other causes of network noise. It is noted that signal distortion will be different for different communication lines, and as such, the characteristics of the signal distortion may be used to determine whether the modem 106 is now connecting via the same communication line as a previous call.

Returning now to FIG. 3, in step 304 the portion of the training signal used for line detection is extracted from the signal received by the modem 106. In one embodiment of the invention a set of 8 levels is defined for line detection, and these 8 levels are the first training part of the Digital Impairment Learning (DIL) signal. The DIL signal is a signal defined in the V.90/V.92 standard that is a series of PCM levels that allows the analog modem to detect and learn about digital impairments in the signal path. Although the DIL signal is conventionally used to determine digital impairments, in accordance with one aspect of the invention, the DIL signal is used to perform line detection. These 8 levels in 24 RBS phase form a raw vector with 8×24=196 elements. The difference of line impairments and line noise conditions will make a difference in the raw vector. The analysis of the MSE for each element of the vector provides a line noise level. The analysis of subvectors for different levels and RBS phase provides a digital impairment difference between the current line and an old line. Furthermore, the line detection vector also provides raw data to detect channel frequency response. This is to distinguish a channel with different loops even if these loops have the same digital impairments and the same noise level. The line extraction features includes digital impairments, codec distortion, line noise level, channel frequency response, etc.

Figure 3:
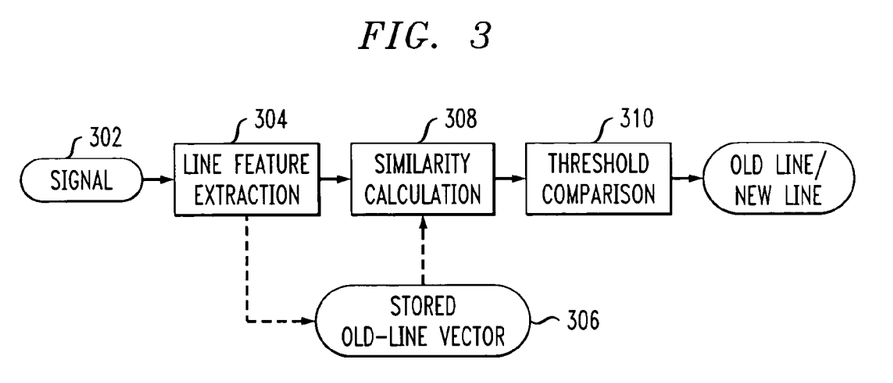
FIG. 3 shows a flowchart of the steps performed by a modem during line detection in accordance with an embodiment of the present invention.

The stored old-line vector 306 shown in FIG. 3 is the stored output of the line feature extraction step 304 from a prior call. The old-line vector is stored only if a modem enters the data mode and the modem call ends up as a successful call. In such a case, the vector output from the line feature extraction step 304 is saved as a stored old-line vector 306 for use during a subsequent call. If a call does not end as a successful call (i.e., the modem does not enter the data mode after the training mode) then the vector output from the line feature extraction step 304 is not saved as a stored old-line vector 306 in order to avoid saving a bad signal as a reference. In order to obtain the most reliable connection, the stored old line vector information is statistically the mean vector of all successful calls over the same line, and is updated after each successful call.

The current output of the line feature extraction step 304 is provided to a similarity calculation step 308. This step compares the current vector output from the line feature extraction step 304 and the stored old-line vector 306 to determine their similarity. The similarity calculation is based on pattern recognition. Each of the two vectors is transferred into different signal space with each vector represented as a unique point in the space. The distance between the two signal space points is calculated which results in a numerical measure of the similarity of the two vectors. A first exemplary signal space for this calculation may be based on the entire raw vector with synchronized RBS phase between two different calls. This provides an overall similarity of the two channels. A second exemplary signal space is a set of subvectors for each level and each RBS phase to detect a difference of network digital impairments. A third exemplary signal space is the channel frequency response function to detect network loop characteristics. A fourth exemplary signal space is the MSE of each element in the raw vector to distinguish the line noise level and distortion.

The similarity calculation of step 308 provides a set of vector signal space distances, and these distances are compared to thresholds in step 310 in order to determine whether the compared vectors are similar enough to make a determination that the current communication line is the same as the previous communication line. Since there are multiple distances to compare, there are also multiple associated thresholds. Each of the distances and thresholds may be assigned priority weights in order to tune the final determination of similarity. The output of the threshold comparison of step 310 will be an indication that the current line is new or is the same as the old line. The determination of the particular threshold to be used will depend upon the particular implementation and would be well known to one skilled in the art.

Returning now to FIG. 2, after the line detection 204, the test of step 206 passes control to step 208 if a new line was detected, or to step 210 if an old line was detected. If a new line was detected, then in step 208 full training is performed. This full training is standard modem training, without the use of any information from prior sessions. The information from the full training step 208 is stored in step 209. More particularly, receiver training coefficients such as equalizer, timing recovery, echo canceller and power adjustment may be stored in step 209. These coefficients are then reused as an initial training point for the next call. This requires a special phase synchronization function to allow the coefficients to be aligned and reused. This reuse of training coefficients during later training saves training time (faster convergence) and provides better training performance.

Returning now to step 206, if a new line is not detected, then line quality evaluation is performed in step 210. The steps performed during line quality evaluation are described in further detail with reference to the flowchart of FIG. 4. Initially, it is noted that even though at this point a determination has been made that the modem is connecting again through an old line, there still may be significantly different performance on that same line due to different channel environment and line noise. Thus, line quality evaluation is performed in order to determine whether the characteristics of the current line and the average of multiple previous lines are within certain tolerances.

Figure 4:
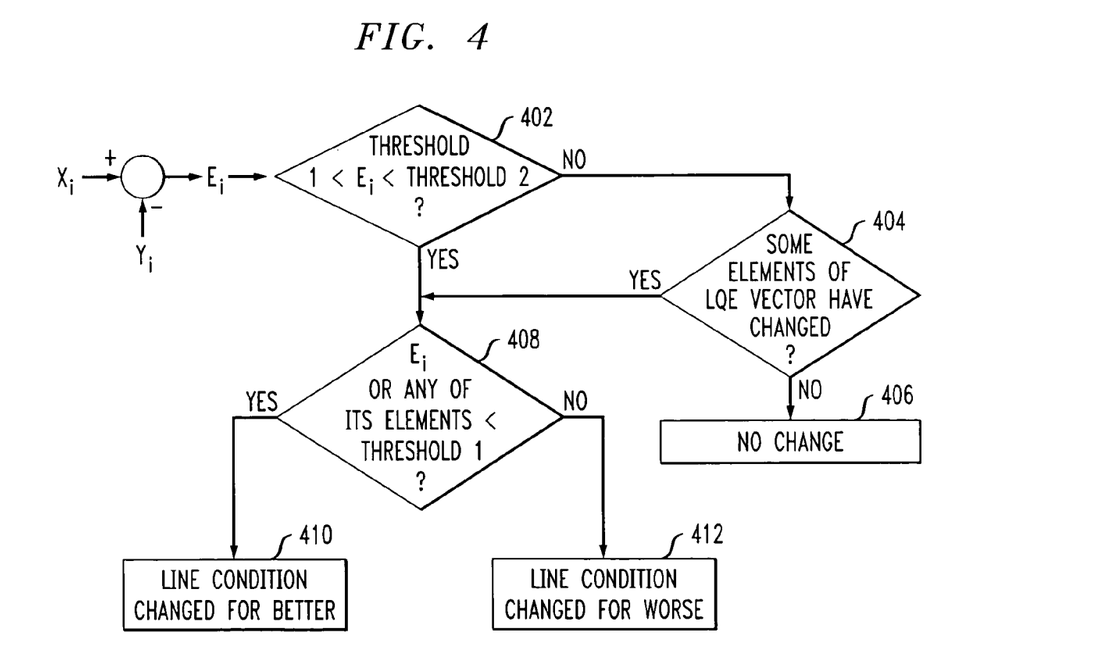
FIG. 4 shows a flowchart of the steps performed by a modem during line quality evaluation in accordance with an embodiment of the present invention.

Referring now to FIG. 4, the inputs to the line quality evaluation are $X_i$ and $Y_i$. $X_i$ represents a signal called the line quality evaluation (LQE) vector which is extracted (by MSE) from the first 8 levels of the DIL signal, equalizer training, and training phase 4 constellation training signal. The LQE vector includes elements from DIL MSE, equalizer training MSE and constellation training MSE. $Y_i$ is the mean LQE vector over multiple previous calls. $E_i$ is calculated as $E_i=X_i-Y_i$ and represents the difference between the current LQE vector and the mean LQE vector, and is used to determine whether, and how, the current line quality has changed from the mean. In step 402 it is determined whether $E_i$ is within a tolerance range (THRESHOLD 1<$E_i$<THRESHOLD 2). The determination of the particular threshold to be used will depend upon the particular implementation and would be well known to one skilled in the art. If $E_i$ is within the tolerance range, then this indicates that the line condition (as measured by the total LQE vector) has not changed. Control then passes to step 404 in which it is determined whether any of the individual elements of the LQE vector have changed significantly. If both the test in step 402 (total LQE vector) and the test in step 404 (individual vector elements) indicates no significant change, then a determination of no line change is made as represented by step 406. If either the test in step 402 or the test in step 404 indicate a significant change, then control passes to step 408 where it is determined whether $E_i$ or any of its elements are less than the lower threshold (THRESHOLD 1). A NO result for the test of step 408 indicates that the line condition has changed for the worse (412), and a YES result for the test of step 408 indicates that the line condition has changed for the better (410). The output of the line quality evaluation step 210 is an indication of no change in line condition, a change in line condition for better, or a change in line condition for worse.

Returning now to FIG. 2, after the line quality evaluation step 210, the modem uses the information to design the signal constellation which, as described above, has a direct affect on the data rate of the modem.

If the line quality evaluation step determines that there has been no change in the line quality, then in step 212 previously stored information is reused in the constellation design as follows. In accordance with the principles of the present invention, certain data mode information is saved so that it may be re-used during subsequent training mode sessions in order to improve the performance of the modem. As discussed above, one of the problems with conventional prior art modems is that they estimate data mode MSE based only on the training mode MSE. A modem designed in accordance with the principles of the present invention improves upon the prior art modems by saving data mode MSE information for use during subsequent training mode sessions. It is also noted that the MSE varies somewhat over time during the data mode. Various information regarding the data mode MSE is stored, such as the MSE mean, MSE distribution range, and the time variable properties of the MSE.

As for the data mode noise, each received signal plus noise sample can also be expressed as one unique point in signal space. Since the noise is random, if all received noise is accumulated and mapped onto signal space, then a noise distribution area can be seen. The signal is at the center of the signal space with the noise around it. The closer to the center of the area, the weaker the noise. The size of the area (i.e., the distance from the center to the edge of the mean density) is measured by noise (MSE). In other words, the MSE is the size of the noise area. The signal-to-noise ratio (SNR) is equal to the minimal signal distance over the MSE. If the signal distance is less than the MSE, then the two adjacent signals are completely mixed into the noise area, and so the receiver can not find it (i.e., will consider it as noise). If the signal distance is far greater than MSE, which means the noise area only occupies a small area between the two signals, then the receiver can easily distinguish the two signals. In theory, the SNR has a fixed relation to the bit error rate for Gaussian noise environment.

In addition to the MSE information, the modem also stores information regarding the signal constellation used during the data mode session, such as the minimal signal distance of the constellation and the relation between the minimal signal distance and data mode MSE.

The storage of the above described data mode information for use during subsequent training mode sessions allows for improved constellation design during these subsequent training mode sessions. The modem knows the MSE distribution function over multiple calls for both training mode and data mode and it also knows the relationship between the training mode MSE and the data mode MSE. Thus, during a training session, based on current training mode MSE the modem may more reliably estimate the data mode MSE and calculate the optimal data rate for the current call.

Returning now to step 212, since there has been no change in the line condition, the modem may safely use stored information from prior data mode sessions. The constellation design in accordance with step 212 can reuse the previously stored information in two ways. If the stored information is only based on a few (e.g., 3) prior calls, then the constellation design will use current training mode information as well as stored prior data mode information, and the relation curve between the current and prior data, to design the new constellation which is based on data mode MSE. If the stored information is based on a sufficient number of prior calls (e.g., more than 3) then the modem may simply reuse the prior data rate. Even if the same data rate is reused, the constellation will vary from call to call because the noise in each call will not be exactly the same. If the same line is detected and the line condition is within the tolerance range, the MSE and data rate relation could be reused and the constellation design will use the previous data rate, because the performance of the prior data rate has been verified over a sufficient number of prior calls to give a high level of confidence of repeat performance. After step 212, the modem enters the data mode in step 214, during which it stores data mode information as described above for use during subsequent training sessions.

If the line quality evaluation step 210 determines that there has been a change for the better in the line quality, then in step 216 the modem uses the prior data mode information to design a signal constellation as described above in connection with step 212, but in this case the constellation is designed with smaller minimal signal distance in order to increase the data rate to take advantage of the improved line quality (smaller MSE). After constellation design, the modem enters the data mode in step 218. During data mode, as represented by step 220, the modem will verify whether the higher data rate is providing reliable communications by evaluating the SNR during data mode. If the reliability of the higher data rate is verified (SNR is greater than threshold), then the modem stores the data mode MSE information for subsequent use. If the reliability of the higher data rate is not verified, then this call is considered as an exceptional case and the data mode MSE information is not stored for subsequent use. In this exception case, the client modem may issue a retraining command to force the modem to retrain to remove the exception.

If the line quality evaluation step 210 determines that there has been a change for the worse in the line quality, then in step 222 the modem uses the prior data mode information to design a signal constellation as described above in connection with step 212, but in this case the constellation is designed with larger minimal signal distance in order to decrease the data rate to compensate for the reduced line quality. After constellation design, the modem enters the data mode in step 224. During data mode, as represented by step 226, the modem will verify whether the lower data rate is providing reliable communications by evaluating the SNR during data mode as described above in connection with step 220. If the reliability of the lower data rate is verified, then the modem stores the data mode MSE information for subsequent use. If the reliability of the lower data rate is not verified, then this call is considered as an exceptional case and the data mode MSE information is not stored for subsequent use. In this exception case, the client modem may issue a retraining command to force the modem to retrain to remove the exception. Thus, as described above, the present invention takes advantage of similar characteristics of a communication line between a previous and current modem call in order to improve modem performance. In particular, the use of stored data mode information from a prior call improves the training speed during a subsequent call, and also improves the data rate for the subsequent call by allowing for improved constellation design.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for training a modem comprising the steps of:
   determining whether characteristics of a current communication line used during a current call are substantially similar to characteristics of a prior communication line used during a plurality of prior calls;
   if the characteristics of said current communication line are substantially similar to the characteristics of said prior communication line and if the number of the plurality of prior calls is greater than a value, then using stored data mode information from said plurality of prior calls without using said characteristics of said current communication line to design a signal constellation for use during the current call's data mode; and
   if the characteristics of said current communication line are substantially similar to the characteristics of said prior communication line, and if the number of the plurality of prior calls is not greater than said value, then using stored data mode information from said plurality of prior calls and said characteristics of said current communication line to design a signal constellation for use during the current call's data mode.

2. The method of claim 1 further comprising the step of:
   if the characteristics of said current communication line are not substantially similar to the characteristics of said prior communication line then performing full modem training, and storing data mode information from said current call for use during at least one subsequent call's training mode.

3. The method of claim 1 wherein said stored data mode information comprises mean squared error data.

4. Phe method of claim 1 wherein said stored data mode information comprises constellation minimal signal distance.

5. The method of claim 1 wherein said stored data mode information comprises constellation transmission power.

6. The method of claim 1 further comprising the step of:
performing line quality evaluation between said current communication line and said prior communication line.

7. The method of claim 6 further comprising the step of:
if said line quality evaluation indicates no change between the quality of said prior communication line and said current communication line then designing for the current call a signal constellation using stored minimal signal distance from a prior call.

8. The method of claim 6 further comprising the step of:
if said line quality evaluation indicates a change for the better between the quality of said prior communication line and said current communication line then designing a new signal constellation having a smaller minimal signal distance than a prior call's signal constellation.

9. The method of claim 8 further comprising the step of:
verifying reliability of said new signal constellation.

10. The method of claim 9 further comprising the step of:
if the reliability of said new signal constellation is not verified, then issuing a retraining command.

11. The method of claim 6 further comprising the step of:
if said line quality evaluation indicates a change for the worse between the quality of said prior communication line and said current communication line then designing a new signal constellation having a larger minimal signal distance than a prior call's signal constellation.

12. The method of claim 11 further comprising the step of:
verifying reliability of said new signal constellation.

13. The method of claim 12 further comprising the step of:
if the reliability of said new signal constellation is not verified, then issuing a retraining command.

14. The method of claim 1 where said step of determining whether characteristics of a current communication line used during a current call are substantially similar to characteristics a prior communication line used during a plurality of prior calls further comprises the steps of:
extracting a digital impairment learning signal from a signal received from a remote modem; and
comparing said extracted digital impairment learning signal to a stored digital impairment learning signal extracted during said plurality of prior calls.

15. A modem comprising:
means for determining whether characteristics of a current communication line used during a current call are substantially similar to characteristics of a prior communication line used during a plurality of prior calls;
means for designing a signal constellation for use in the current call's data mode using stored data mode information from said plurality prior calls without using said characteristics of said current communication line if the characteristics of said current communication line are substantially similar to the characteristics of said prior communication line, and if the number of the plurality of prior calls is greater than a value: and
means for designing a signal constellation for use in the current call's data mode using stored data mode information from said plurality of prior calls and said characteristics of said current communication line if the characteristics of said current communication line are substantially similar to the characteristics of said prior communication line, and if the number of the plurality of prior calls is not greater than said value.

16. The modem of claim 15 further comprising:
means for performing full modem training and storing data mode information from said current call for use during at least one subsequent call's training mode if the characteristics of said current communication line are not substantially similar to the characteristics of said prior communication line.

17. The modem of claim 15 wherein said stored data mode information comprises mean squared error data.

18. The modem of claim 15 wherein said stored data mode information comprises constellation minimal signal distance.

19. The modem of claim 15 wherein said stored data mode information comprises constellation transmission power.

20. The modem of claim 15 further comprising:
means for performing line quality evaluation between said current communication line and said prior communication line.

21. The modem of claim 20 further comprising:
means for designing for the current call a signal constellation using stored minimal signal distance from a prior call if said line quality evaluation indicates no change between the quality of said prior communication line and said current communication line.

22. The modem of claim 20 further comprising:
means for designing a new signal constellation having a smaller minimal signal distance than a prior call's signal constellation if said line quality evaluation indicates a change for the better between the quality of said prior communication line and said current communication line.

23. The modem of claim 22 further comprising:
means for verifying reliability of said new signal constellation.

24. The modem of claim 23 further comprising:
means for issuing a retraining command if the reliability of said new signal constellation is not verified.

25. The modem of claim 20 further comprising:
means for designing a new signal constellation having a larger minimal signal distance than a prior call's signal constellation if said line quality evaluation indicates a change for the worse between the quality of said prior communication line and said current communication line.

26. The modem of claim 25 further comprising:
means for verifying reliability of said new signal constellation.

27. The modem of claim 26 further comprising:
means for issuing a retraining command if the reliability of said new signal constellation is not verified.

28. The modem of claim 15 where said means for determining whether characteristics of a current communication line used during a current call are substantially similar to characteristics a prior communication line used during a plurality of prior calls further comprises:
means for extracting a digital impairment learning signal from a signal received from a remote modem; and
means for comparing said extracted digital impairment learning signal to a stored digital impairment learning signal extracted during said at least one prior call.

29. A method for training a modem which communicates via a first communication line during a first call and a second communication line during a plurality of calls prior to said first call, said method comprising the steps of:

determining at a time when said modem is communicating via said first communication line whether characteristics of said first communication line are substantially similar to characteristics of said second communication line;

if the characteristics of said first communication line are substantially similar to the characteristics of said second communication line and if the number of the plurality of prior calls is greater than a value then using stored data mode information from said plurality of prior calls without using said characteristics of said first communication line to design a signal constellation for use during said first call's data mode; and if the characteristics of said first communication line are substantially similar to the characteristics of said second communication line and if the number of the plurality of prior calls is not greater than said value, then using stored data mode information from said plurality of prior calls and said characteristics of said first communication line to design a signal constellation for use during said first call's data mode.

30. The method of claim 29 further comprising the step of:
if the characteristics of said first communication line are not substantially similar to the characteristics of said second communication line then performing full modem training, and storing data mode information from said first call for use during a subsequent call's training mode.

31. The method of claim 29 wherein said stored data mode information comprises mean squared error data.

32. The method of claim 29 wherein said stored data mode information comprises constellation minimal signal distance.

33. The method of claim 29 wherein said stored data mode information comprises constellation transmission power.

34. The method of claim 29 further comprising the step of: performing line quality evaluation between said first communication line and said second communication line.

35. The method of claim 34 further comprising the step of:
if said line quality evaluation indicates no change between the quality of said second communication line and said first communication line then designing for said first call a signal constellation using stored minimal signal distance from said at least one second call.

36. The method of claim 34 further comprising the step of:
if said line quality evaluation indicates a change for the better between the quality of said second communication line and said first communication line then designing a new signal constellation having a smaller minimal signal distance than said at least one second call's signal constellation.

37. The method of claim 36 further comprising the step of: verifying reliability of said new signal constellation.

38. The method of claim 37 further comprising the step of:
if the reliability of said new signal constellation is not verified, then issuing a retraining command.

39. The method of claim 34 further comprising the step of:
if said line quality evaluation indicates a change for the worse between the quality of said second communication line and said first communication line then designing a new signal constellation having a larger minimal signal distance than said at least one second call's signal constellation.

40. The method of claim 39 further comprising the step of: verifying reliability of said new signal constellation.

41. The method of claim 40 further comprising the step of:
if the reliability of said new signal constellation is not verified, then issuing a retraining command.

42. The method of claim 29 where said step of determining at a time when said modem is communicating via said first communication line whether characteristics of said first communication line are substantially similar to characteristics of said second communication line further comprises the steps of:
extracting a digital impairment learning signal from a signal received from a remote modem; and
comparing said extracted digital impairment learning signal to a stored digital impairment learning signal extracted during said at least one second call.

43. A modem comprising at least one processor and stored computer program instructions which, when executed by said at least one processor, cause said modem to perform the steps of:
determining whether characteristics of a current communication line used during a current call are substantially similar to characteristics of a prior communication line used during a plurality of prior calls;
if the characteristics of said current communication line are substantially similar to the characteristics of said prior communication line and if the number of the plurality of prior calls is greater than a value, then using stored data mode information from said plurality of prior calls without using said characteristics of said current communication line to design a signal constellation for use during the current call's data mode; and
if the characteristics of said current communication line are substantially similar to the characteristics of said prior communication line and if the number of the plurality of prior calls is not greater than said value, then using stored data mode information from said plurality of prior calls and said characteristics of said current communication line to design a signal constellation for use during the current call's data mode.

44. The modem of claim 43 further comprising computer program instructions which, when executed by said at least one processor, cause said modem to perform the step of:
if the characteristics of said current communication line are not substantially similar to the characteristics of said prior communication line then performing full modem training, and storing data mode information from said current call for use during at least one subsequent call's training mode.

45. The modem of claim 43 wherein said stored data mode information comprises mean squared error data.

46. The modem of claim 43 wherein said stored data mode information comprises constellation minimal signal distance.

47. The modem of claim 43 wherein said stored data mode information comprises constellation transmission power.

48. The modem of claim 43 further comprising computer program instructions which, when executed by said at least one processor, cause said modem to perform the step of:
performing line quality evaluation between said current communication line and said prior communication line.

49. The modem of claim 48 further comprising computer program instructions which, when executed by said at least one processor, cause said modem to perform the step of:
if said line quality evaluation indicates no change between the quality of said prior communication line and said current communication line then designing for the current call a signal constellation using stored minimal signal distance from a prior call.

50. The modem of claim 48 further comprising computer program instructions which, when executed by said at least one processor, cause said modem to perform the step of:

if said line quality evaluation indicates a change for the better between the quality of said prior communication line and said current communication line then designing a new signal constellation having a smaller minimal signal distance than a prior call's signal constellation.

51. The modem of claim 50 further comprising computer program instructions which, when executed by said at least one processor, cause said modem to perform the step of:

verifying reliability of said new signal constellation.

52. The modem of claim 51 further comprising computer program instructions which, when executed by said at least one processor, cause said modem to perform the step of:

if the reliability of said new signal constellation is not verified, then issuing a retraining command.

53. The modem of claim 48 further comprising computer program instructions which, when executed by said at least one processor, cause said modem to perform the step of:

if said line quality evaluation indicates a change for the worse between the quality of said prior communication line and said current communication line then designing a new signal constellation having a larger minimal signal distance than a prior call's signal constellation.

54. The modem of claim 53 further comprising computer program instructions which, when executed by said at least one processor, cause said modem to perform the step of:

verifying reliability of said new signal constellation.

55. The modem of claim 54 further comprising computer program instructions which, when executed by said at least one processor, cause said modem to perform the step of:

if the reliability of said new signal constellation is not verified, then issuing a retraining command.

56. The modem of claim 43 wherein said computer program instructions which, when executed by said at least one processor, cause said modem to perform the step of determining whether the characteristics of a current communication line used during a current call are substantially similar to the characteristics a prior communication line used during at least one prior call further comprise computer program instructions which, when executed by said at least one processor, cause said modem to perform the steps of:

extracting a digital impairment learning signal from, a signal received from a remote modem; and comparing said extracted digital impairment learning signal to a stored digital impairment learning signal extracted during said at least one prior call.

\* \* \* \* \*

UNITED STATES PATENT AND TRADEMARK OFFICE
CERTIFICATE OF CORRECTION

| | | |
|---|---|---|
| PATENT NO. | : 7,711,040 B2 | Page 1 of 1 |
| APPLICATION NO. | : 10/993378 | |
| DATED | : May 4, 2010 | |
| INVENTOR(S) | : Min Liang | |

It is certified that error appears in the above-identified patent and that said Letters Patent is hereby corrected as shown below:

In claim 4, column 9, line 6, "Phe" should be replaced by -- The --.

Signed and Sealed this
Twenty-fifth Day of December, 2012

David J. Kappos
*Director of the United States Patent and Trademark Office*